(12) United States Patent
Ott

(10) Patent No.: US 12,064,839 B2
(45) Date of Patent: Aug. 20, 2024

(54) METHOD FOR PRODUCING A COMPOSITE ELEMENT

(71) Applicant: SCHOTT AG, Mainz (DE)

(72) Inventor: Christian Ott, Ampfing (DE)

(73) Assignee: SCHOTT AG, Mainz (DE)

( * ) Notice: Subject to any disclaimer, the term of this patent is extended or adjusted under 35 U.S.C. 154(b) by 856 days.

(21) Appl. No.: 16/893,458

(22) Filed: Jun. 5, 2020

(65) Prior Publication Data

US 2020/0384587 A1    Dec. 10, 2020

(30) Foreign Application Priority Data

Jun. 5, 2019  (DE) .................... 10 2019 115 204.6

(51) Int. Cl.
  *B23P 19/04*    (2006.01)
  *H01B 17/26*   (2006.01)
  *H01B 19/00*   (2006.01)

(52) U.S. Cl.
  CPC .............. *B23P 19/04* (2013.01); *H01B 17/26* (2013.01); *H01B 19/00* (2013.01); *Y10T 29/49155* (2015.01)

(58) Field of Classification Search
  CPC ..... H01L 23/373; H01L 23/40; H01L 23/367; B32B 2307/30; B32B 2307/412; Y10T 29/49155; B23P 19/04
  (Continued)

(56) References Cited

U.S. PATENT DOCUMENTS 4,128,697 A  12/1978  Simpson
6,874,423 B2  4/2005  Heeke
(Continued)

FOREIGN PATENT DOCUMENTS

CN  102414497  4/2012
CN  102428051  4/2012
(Continued)

OTHER PUBLICATIONS

Opini, "a phase precipitation and mechanical properties of Nb-modified Ti-5553 alloy", Materials Science & Engineering A, 670 (2016), pp. 112-121.
(Continued)

*Primary Examiner* — Thiem D Phan
(74) *Attorney, Agent, or Firm* — Ruggiero McAllister & McMahon LLC

(57) ABSTRACT

A method for producing a composite element is provided. The method includes providing an outer frame comprising metal and having a first coefficient of thermal expansion in a first spatial direction and a second coefficient of thermal expansion in a second spatial direction, the first and second coefficient of thermal expansions differing from one another; providing an inner component comprising glass; heating the outer frame to an expanded state having the outer frame expanded with respect to the inner component in the first spatial direction in accordance with the first coefficient of thermal expansion and expanded along the second spatial direction in accordance with the second coefficient of thermal expansion; inserting the inner component in the outer frame when in the expanded state; and cooling the outer frame so that the outer frame contracts from the expanded state until the inner component is fitted in outer frame under compressive stress.

19 Claims, 3 Drawing Sheets

(58) Field of Classification Search
USPC .................................. 29/846, 592.1, 825, 829
See application file for complete search history.

(56) References Cited

U.S. PATENT DOCUMENTS

| | | | |
|---|---|---|---|
| 9,175,999 B2 * | 11/2015 | Paterek | ............. G01F 23/02 |
| 9,423,218 B2 | 8/2016 | Hartl | |
| 2001/0055716 A1 | 12/2001 | Frysz | |
| 2005/0099703 A1 | 5/2005 | Hashimoto | |
| 2005/0255380 A1 | 11/2005 | Lasater | |
| 2012/0001421 A1 | 1/2012 | His | |
| 2012/0034403 A1 | 2/2012 | Paterek | |
| 2016/0036016 A1 | 2/2016 | Dalhmann | |
| 2019/0112225 A1 | 4/2019 | Mix | |
| 2019/0337836 A1 | 11/2019 | De Deken | |

FOREIGN PATENT DOCUMENTS

| | | |
|---|---|---|
| CN | 109641784 | 4/2019 |
| DE | 102013006463 | 10/2014 |
| GB | 1312700 | 4/1973 |
| WO | 2016189225 | 12/2016 |

OTHER PUBLICATIONS

Wang, "A microstructure with improved thermal stability and creep resistance in a novel near-alphs titanium alloy", Materials Science & Engineering A, 731 (2018), pp. 12-20.

Wang, "Adjustable zero thermal expansion in Ti alloys at cryogenic temperature", Journal of Alloys and Compounds, 740, (2018), pp. 47-51.

Abdel-Hady, "Controlling the thermal expansion of Ti alloys", ScienceDirect, Scripta Materialia 61 (2009), pp. 825-827.

Shao, "Formation mechanism of an $\alpha_2$ phase-rich layer on the surface of Ti-22AI-25Nb alloy", Materials Characterization, 145, (2018) pp. 205-209.

Bönisch, "Giant thermal expansion and a-precipitation pathways in Ti-alloys", Nature Communications, 8:1429, 9 pages.

Du Merac, "Increasing Fracture Toughness and Transmittance of Transparent Ceramics using Functional Low-Thermal Expansion Coatings", Scientific Reports, (2018), 8:15644 | DOI:10.1038/s41598-018-33919-5, 9 pages.

Maury, "Influence of the ageing conditions and the initial microstructure on the precipitation of a phase in Ti-17 alloy", Journal of Alloys and Compounds, 763, (2018), pp. 446-458.

Mantri, "Microstructure and micro-texture evolution of additively manufactured β-Ti alloys", Additive Manufacturing, 23, (2018), pp. 86-98.

Ahadi, "Origin of zero and negative thermal expansion in severely-deformed superelastic NiTi alloy", Acta Materialia, 124, (2017), pp. 79-92.

Monroe, "Tailored thermal expansion alloys", Acta Materialia, 102, (2016), pp. 333-341.

Wang, "Metal fluorides, a new familyy of negative thermal expansion materials", ScienceDirect, Journal of Materiomics 1 (2015), pp. 106-112.

* cited by examiner

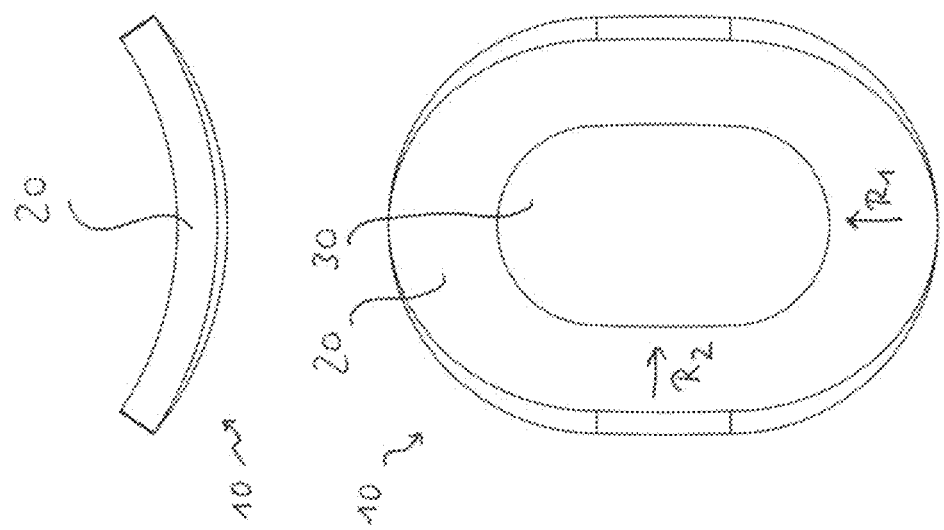
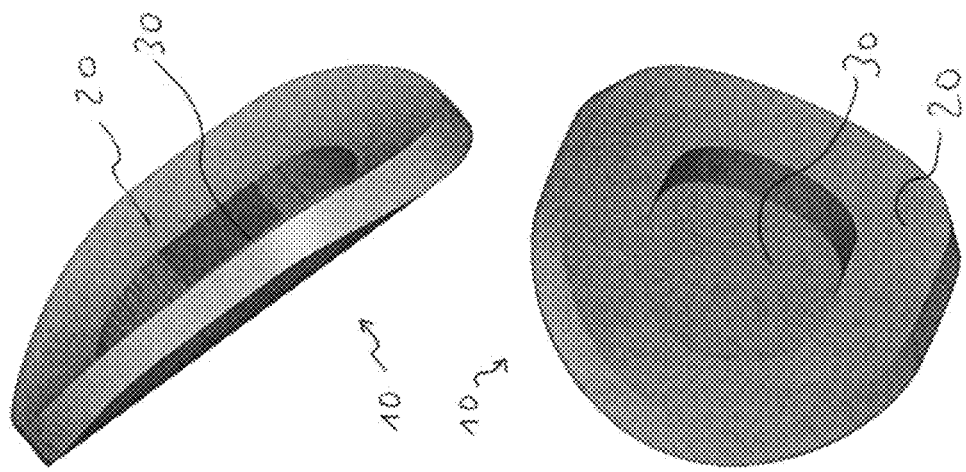
Fig. 5
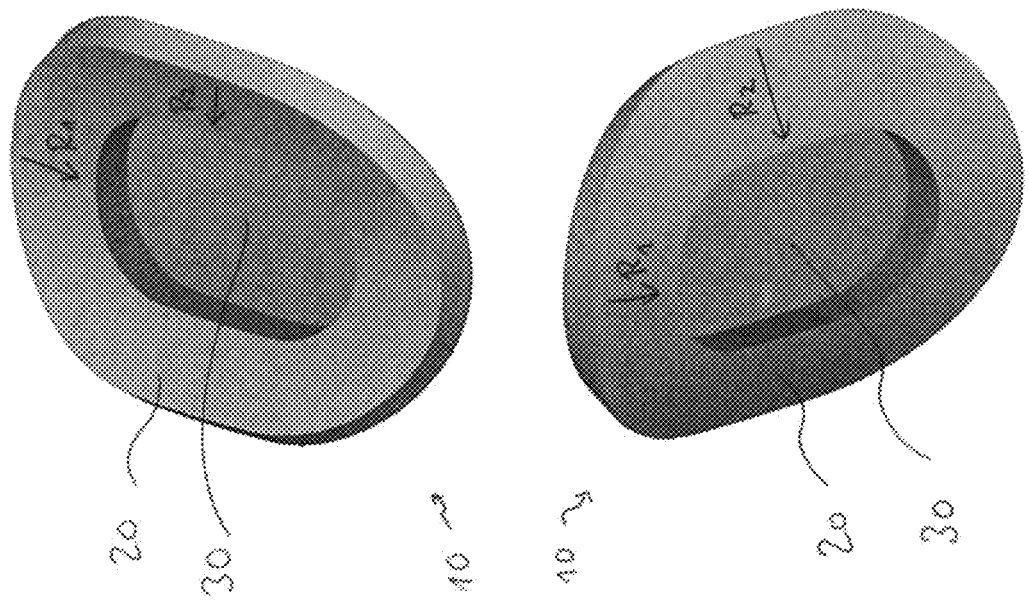

METHOD FOR PRODUCING A COMPOSITE ELEMENT

CROSS REFERENCE TO RELATED APPLICATIONS

This application claims benefit under 35 USC X119 of German Application 10 2019 115 204.6 filed Jun. 5, 2019, the entire contents of which are incorporated herein by reference.

BACKGROUND

1. Field of the Invention

The invention relates to a production method for a composite element as well as to a corresponding composite element having an outer frame, which is comprised of metal, and an inner component, which is comprised of glass and is fitted vertically in the outer frame under compressive stress.

2. Description of Related Art

Composite elements made of an outer metal frame and an inner glass component, which are also referred to as glass-to-metal seals (GTMS), are used in numerous applications, such as, for instance, for hermetic housing parts or electrical feedthroughs. In the case of housing parts, the inner glass component can serve, for example, as a viewing port in order to make possible, for example, spectral investigations in the interior of tanks, such as, for instance, bioreactors. In the case of electrical feedthroughs, the inner glass component acts as an insulator through which electrical conductors are passed.

In principle, it is possible to divide glass-metal composite elements into two categories. On the one hand, elements for which the thermal expansion behavior of the metal housing and that of the glass component are matched to each other, so-called matched glass-to-metal seals, and, on the other hand, elements for which the metal housing exerts a compressive pressure on the glass component, so-called compression glass-to-metal seals. Matched glass-to-metal seals are suitable, in particular, for applications in which a uniform expansion behavior or contraction behavior under fluctuating temperature conditions is needed, or a metal housing that is as thin as possible is required, so that sufficient compressive pressure cannot be produced. On the contrary, when these factors are not paramount, generally compression glass-to-metal seals are used. Typically, compression glass-to-metal seals exhibit high resistance to corrosion and tolerance to pressure.

Compression glass-to-metal seals can be produced by shrinking a metal ring onto the glass body. As a result, the metal housing surrounds the inner glass firmly and a hermetic seal is created. In addition, owing to the sometimes high compressive pressure on the glass, it is possible to achieve a high resilience of the composite element. However, it needs to be noted that there is a limit to the feasible difference in expansion between the thermal expansion of the metal and that of the glass. If the difference in expansion is too small, the tightness of the composite element or of the feedthrough can be impaired, whereas, if the difference in expansion is too large, the structural part can be unstable. The process of shrinkage results in a concentric pressure of the metal ring on the glass body. This places limits on both the transparent element that can be used and the design of the composite element.

Until now, therefore, the focus has been placed on radially symmetric and planar designs as well as on designs with an edge overhang, that is, with a somewhat deeper-lying glass body. By contrast, glass edges that are fitted flush or else protrude from the metal ring, but also curved glass surfaces, are problematic, because, owing to the reduction of compressive force outside of the housing, cracks can form. Furthermore, only certain combinations of materials have hitherto come into consideration. These limits need to be surmounted in regard to design and material combinations.

SUMMARY

Accordingly, an object of the invention is to provide composite elements as well as a production method for composite elements, which have an outer frame, in particular one comprised of metal, and an inner component, in particular one comprised of glass and fitted under compressive stress, so that further structural forms and the use of additional materials are made possible, in particular, designs without radial symmetry, planar surfaces, and/or edge overhang.

In accordance with the invention, a method for producing a composite element having an outer frame and an inner component is presented, wherein the inner component is fitted in the outer frame under compressive stress, and the outer component has a first coefficient of thermal expansion for a first spatial direction and a second coefficient of thermal expansion, which differs from it, for a second spatial direction.

The outer frame is, in particular, made with or from metal and the inner component is, in particular, made with or from glass. The fitting of the inner component under compressive stress results, in particular, in a hermetic seal between the outer frame and the inner component. Accordingly, the composite element that can be produced or is produced in accordance with the method is, in particular, a compression glass-to-metal seal (GTMS).

Because the outer component has two different coefficients of thermal expansion for different spatial directions, there exists an anisotropic thermal expansion or contraction of the outer component. In other words, the thermal expansion or contraction is not described by a single scalar expansion coefficient, but, in general, by an expansion tensor.

The method according to the invention comprises, first of all, the heating of the outer frame in such a way that the outer frame expands with respect to the inner component, whereby, along the first spatial direction, a change in length occurs in accordance with the first coefficient of thermal expansion and, along the second spatial direction, a change in length occurs in accordance with the second coefficient of thermal expansion. A change in length is understood in general to mean both an expansion and a contraction in each case, whereby, on account of the heating, particularly expansions occur in each case.

The method further comprises the insertion of the inner component in the outer frame, which is expanded with respect to the inner component.

Moreover, the method comprises the cooling of the outer frame in such a way that the outer frame contracts once again with respect to the inner component, whereby, along the first spatial direction, a change in length occurs once again in accordance with the first coefficient of thermal expansion and, along the second spatial direction, a change in length occurs once again in accordance with the second thermal expansion. A change in length is understood in general to mean both an expansion and a contraction in each case, whereby, due to the cooling, particularly contractions occur in each case.

In accordance with the method, the outer frame fits the inner component under compressive stress, so that, in particular, a hermetic seal is created. Accordingly, the composite element GTMS thus produced exhibits, in particular, a directionally linked different expansion.

In particular, on account of the anisotropy, it can be provided that, as a result of the cooling, the outer frame fits the inner component under compressive stress in such a way that at least two different compressive stresses act on the inner component, namely, a first compressive stress along the first spatial direction and a second compressive stress, which differs from it, along the second spatial direction.

On the other hand, it can also be provided, however, that although the outer frame contracts anisotropically, essentially equal compressive stresses are exerted on the inner component.

Preferably, moreover, the method comprises the development or influencing of the anisotropy of the thermal expansion or of the coefficient of thermal expansion of the outer frame.

In accordance therewith, it is possible to provide, in particular, a specific change in one coefficient of thermal expansion or in a plurality of coefficients of thermal expansion of the outer frame, so that this coefficient of thermal expansion or these coefficients of thermal expansion each take on a predefined value.

In accordance therewith, the method can comprise the causing of a phase transition in the outer frame, in particular in such a way that, in the material of the outer frame, one crystal phase undergoes a transition to another crystal phase and, in particular, undergoes a transition to a crystal phase that is initially not yet present. As a result of such a phase transition, it is possible, in particular, to influence the thermal expansion behavior of the outer frame in a specific manner.

In general, the causing of the phase transition can be brought about by variation of a state variable of the outer frame. It comes into consideration, for example, that, prior to the heating that takes place for the expansion, the outer frame is subjected to another heating in order to cause a phase transition and/or in order to change one coefficient of thermal expansion or a plurality of coefficients of thermal expansion or that, during the heating that takes place for expansion, a phase transition is initiated and/or a change in one coefficient of thermal expansion or in a plurality of coefficients of thermal expansion of the outer frame is or are brought about.

In the case of the variation of a state variable of the outer frame, in particular the temperature thereof, it is possible to make a comparison with a curve that is already recorded by experiment or simulation, for instance, and depends on the state variable, so that the variation of the state variable that is required for a desired change in the coefficient of thermal expansion can be determined in advance.

In the framework of changing the coefficient of thermal expansion, it can be provided that the first coefficient of thermal expansion for the first spatial direction is changed in such a way that it takes on a predefined value between $-142 \cdot 10^{-6}$ K$^{-1}$ and $+181 \cdot 10^{-6}$ K$^{-1}$, preferably between $-26 \cdot 10^{-6}$ K$^{-1}$ and $+49 \cdot 10^{-6}$ K$^{-1}$, and especially preferred between $-11 \cdot 10^{-6}$ K$^{-1}$ and $+21 \cdot 10^{-6}$ K$^{-1}$.

Moreover, it can be provided that the second coefficient of thermal expansion for the second spatial direction is changed in such a way that it takes on a predefined value between $-11 \cdot 10^{-6}$ K$^{-1}$ and $+24 \cdot 10^{-6}$ K$^{-1}$, preferably between $-4 \cdot 10^{-6}$ K$^{-1}$ and $+21 \cdot 10^{-6}$ K$^{-1}$, and especially preferred between $-1 \cdot 10^{-6}$ K$^{-1}$ and $+1 \cdot 10^{-6}$ K$^{-1}$.

The outer frame that is placed around the inner component preferably comprises a metal, in particular an alloy, or is composed of a metal or an alloy. Preferably, a titanium alloy, in particular in this case an alloy made with or from titanium and niobium, comes into consideration.

A targeted influencing of the crystal structure of the metal or of the alloy can influence the expansion and/or the anisotropy of the expansion in a targeted manner. This makes possible a different thermal expansion in a directionally linked manner. In this way, composite elements, in particular, GTMS having new structural part geometries and/or combinations of materials are made possible.

In general, and in particular in the case of titanium alloys, such as, for example, titanium-niobium alloys (Ti—Nb), it is possible to influence the metal crystal structure in a targeted manner. This makes possible an expansion, sometimes in a directionally linked manner, while, at the same time, a different change in length in another spatial direction can take place all the way to shrinkage. For the composite element, which, in accordance therewith, particularly has a directionally linked different expansion, new structural part geometries and/or combinations of materials are thereby made possible. In general, it is thus possible to surmount hitherto existing limits for composite elements, in particular by a targeted modification of the microstructure of the titanium-niobium alloy.

In the disclosure of this specification, the content of the Nature Communications Article 1429 (2017), Volume 8, "Giant thermal expansion and a-precipitation pathways in Ti-alloys" by the authors Matthias Bönisch, Ajit Panigrahi, Mihai Stoica, Mariana Calin, Eike Ahrens, Michael Zehetbauer, Werner Skrotzki & Jurgen Eckert (DOI: 10.1038/s41467-017-01578-1) is incorporated by reference. In particular, in order to achieve in a targeted manner one thermal expansion or a plurality of thermal expansions for different directions of spatial expansion, reference is made to this content and to the materials science discoveries described in the article.

In particular, when the outer frame comprises a titanium-niobium alloy or is composed of it, but also fundamentally independent thereof, it can be provided that, through the or a heating of the outer frame, in particular through the heating for expansion and/or the heating for causing a phase transition, a phase transition is caused to occur in the titanium-niobium alloy in such a way that an α phase, a β phase, or an ω phase is formed; or that an α phase and a β phase, an α phase and an ω phase, or a β phase and an ω phase are formed; or that an α phase and a β phase and an ω phase are formed.

The microstructure of the outer frame, in particular of the alloy, in particular of the Ti—Nb alloy, depends on, among other things, the temperature profile of the heating in a furnace process, for example.

It can be provided, for example, that the outer frame is heated at a heating rate of 0.01° C./s to 1° C./s, preferably 0.1° C./s to 0.3° C./s, such as, for example, 0.18° C./s, and/or that, during heating, the temperature lies between 700 and 950° C., such as, for example, at 760° C. and/or that the holding time is 0.1 to 10 hours, preferably 0.5 to 4.75 hours. The temperature of 760° C. can represent here, for example, the maximum temperature. In this connection, reference is also made to the method examples mentioned further below.

For the composite elements or the GTMS, it is thus possible to use heat to induce a targeted change in the material structure. It is possible, in particular, to use a melting furnace for heating.

In this case, the microstructure transformation is achieved, in particular, by way of the rate of energy input (heating rates; holding times; maximum temperature) and the energy level, whereby—as already described—in particular, zones with α and β martensite can be formed.

In particular in the case of titanium-niobium alloys, the thereby resulting angles in the crystal structure make possible, in a manner linked to a spatial axis, a combination of extreme thermal heat expansion with little—in the extreme case, even negative—expansion.

Furthermore, the microstructure of the outer frame, in particular of the alloy, in particular of the Ti—Nb alloy, depends on the concentration of admixed components, in particular on the Nb concentration. In the case of a Ti—Nb alloy, the weight percent for niobium is preferentially between 10% and 25%, preferably between 10% and 22%, and especially preferred between 17% and 22%.

Instead of niobium or in addition to niobium, it is also possible for other constituents or additional constituents to be used for the alloy. Thus, the alloy can preferably comprise terbium (Tb), aluminum (Al), carbon (C), chromium (Cr), and/or erbium (Er). It is thereby possible to achieve a further influencing and/or optimization.

Coming into consideration in regard to the inner component are, in particular, glasses, glass-type materials, and/or transparent materials. The inner component, which is surrounded by the outer frame, accordingly comprises, in particular, a glass, a glass-type material, and/or a transparent material or is composed of such a material. Beyond this, the inner component can comprise a conductor feedthrough, which extends through the material of the inner component and, in particular, is fused in it.

Glasses and glass-type materials are tolerant to compressive stress and sensitive to tensile stress. For this reason, the production of curved GTMS has hitherto posed problems. This limitation is overcome in the present invention by way of the designed thermal expansion. The invention makes possible, in addition, the use of materials with a critical compressive stress tolerance, such as, for example, special laser glasses, crystals, etc. Accordingly, the inner component comprises, in particular, one of the following materials or is composed of such a material: glass, quartz, sapphire, glass ceramic, ceramic, laser glass, crystal.

The inner component can comprise, for instance, a silicate-based laser glass or be composed of it (for example, LG-680). Furthermore, the inner component can comprise a phosphate-based laser glass or be composed of it (for example, APG-760, Er- and Yb-doped, BLG-80, Nd- and Yb-doped). The inner component can also comprise a fluorophosphate-based laser glass or be composed of it (for example, Dy- and Eu-doped). Moreover, the inner component can comprise a chloroborate-based laser glass or be composed of it (for example, Yb- and Nd-doped). The inner component can also comprise an aluminate-based laser glass or be composed of it (for example, Tm- and Ho-doped).

An inner component that comprises crystal or is composed of a crystal can comprise, in particular, ZnSe, IRG2, IRGN6 (calcium aluminosilicate), IRG11, polycrystalline super spinel, polycrystalline ZnS, zirconium, and/or yttrium or be composed thereof.

In a preferred embodiment, the inner component comprises a ceramic, in particular a transparent, ceramic, or is composed of such a ceramic. In this embodiment, but also in general, the inner component, for its part, can be designed to be enclosed (whereby the enclosure is, in particular, not the outer frame) in order to increase the scratch resistance or the chemical resistance.

For example, the inner component can comprise yttrium-doped zirconium dioxide (YSZ) or be composed of it and be enclosed or coated with $Y_2O_3$. This embodiment has the advantage that the $Y_2O_3$ coating exerts pressure on the YSZ and compensates for defects in the YSZ near the surface and thus increases the fracture strength. Furthermore, $Y_2O_3$-coated 10 YSZ is transparent from the near UV region to the MIR region (0.4-6 μm, whereby the transmittance can be adjusted by way of the coating), exhibits chemical resistance, is scratch-resistant, is optically isotropic, and has a high refractive index.

For this purpose, it is possible, first of all, to provide an inner component made with or from yttrium-doped zirconium dioxide, preferably to grind and/or polish the yttrium-doped zirconium dioxide, and to coat the yttrium-doped zirconium dioxide with $Y_2O_3$, whereby, by way of a thermal treatment, the yttrium-doped zirconium dioxide can undergo "monocrystallization under pressure".

In accordance with a preferred method of production, a composite element having a coated inner component is produced, in particular, in such a way that the outer frame contracts such that, although a radial compressive stress is exerted on the inner component, there is as little possible or no shear stress transverse and, in particular, perpendicular to the inner component. In this way, it is possible to minimize or prevent the risk of delamination of a coated inner component.

In accordance therewith, it can be provided that the thermal expansion tensor of the outer frame is or will be adjusted so that, transverse and, in particular, perpendicular to the lens surface, a torsional stress between a $Y_2O_3$ coating and the metal boundary surface (outer frame) is prevented and thus a hermetically tight seal is made possible using this combination of materials.

More generally stated, in the embodiment described above, but also in general, it is possible to provide, for example, that the outer frame has a third coefficient of thermal expansion for a third spatial direction, wherein the third spatial direction is transverse to the first spatial direction and transverse to the second spatial direction and/or extends essentially in the axial direction and, in particular, essentially perpendicular to the first spatial direction and perpendicular to the second spatial direction and to provide that the third coefficient of thermal expansion has a value of less than $1 \cdot 10^{-6}$ $K^{-1}$, preferably of less than $0.1 \cdot 10^{-6}$ $K^{-1}$, especially preferred of less than $0.01 \cdot 10^{-6}$ $K^{-1}$, and even more preferably of less than $0.001 \cdot 10^{-6}$ $K^{-1}$, in particular in that the third coefficient of thermal expansion is changed in a targeted manner so that the amount of the third coefficient of thermal expansion has this value, in particular such that, as a result of the cooling of the outer frame (20), the outer frame (20) fits the inner component (30) under compressive stress in such a way that stresses, such as, for example shear stresses, on the inner component (30) along the third spatial direction are minimized or prevented.

Furthermore, the inner component preferably has a compressive stress tolerance that is less than 585 MPa, preferably less than 100 MPa, especially preferred less than 8 MPa.

As described already, the invention makes possible, in particular, new geometries of structural parts, which can deviate from the hitherto usual radially symmetric composite elements having planar main surfaces of the inner component.

In accordance therewith, in cross section, the inner component can have, in particular, a shape that is not circular, but rather, in particular, is oval, polygonal, or rounded polygonal. As a result of the cooling of the outer frame with anisotropic contraction, the outer frame can enclose the inner component in cross section in a hermetically tight manner.

Furthermore, in the axial direction, the inner component can have at least one arched surface, in particular a convex or concave surface, which, moreover, in particular, can protrude out of the outer frame, that is, does not necessitate any edge overhang.

Also now possible are adjustments to different expansions that occur internally in the structural part. Hitherto, such expansions have led to critical stresses after soldering or welding of GTMS in the structural part, for example.

Accordingly, the invention opens up innovative applications overall in applications involving medical technology and biotechnology, for example.

The invention further relates to composite elements, which, in particular, are produced or can be produced in accordance with the method described above.

Thus, in accordance with the invention, a composite element that has an outer frame and an inner component is provided, wherein the inner component is fitted in the outer frame under compressive stress and the outer component has a first coefficient of thermal expansion for a first spatial direction and a second coefficient of thermal expansion, which differs from it, for a second spatial direction, wherein the outer frame is made, in particular, with or from metal and the inner component is made, in particular, with or from glass. Thereby provided is, in particular, a compression glass-to-metal seal (GTMS).

The inner component is fitted in the outer frame under compressive stress, in particular in such a way that two different compressive stresses act on the inner component, namely, a first compressive stress along the first spatial direction and a second compressive stress, which differs from it, along the second spatial direction.

The first coefficient of thermal expansion for the first spatial direction preferably has a value between $-142 \cdot 10^{-6}$ $K^{-1}$ and $+181 \cdot 10^{-6}$ $K^{-1}$, preferably between $-26 \cdot 10^{-6}$ $K^{-1}$ and $+49 \cdot 10^{-6}$ $K^{-1}$, and especially preferred between $-11 \cdot 10^{-6}$ $K^{-1}$ and $+21 \cdot 10^{-6}$ $K^{-1}$. Moreover, the second coefficient of thermal expansion for the second spatial direction can have a value between $-11 \cdot 10^{-6}$ $K^{-1}$ and $+24 \cdot 10^{-6}$ $K^{-1}$, preferably between $-4 \cdot 10^{-6}$ $K^{-1}$ and $+21 \cdot 10^{-6}$ $K^{-1}$, and especially preferred between $-1 \cdot 10^{-6}$ $K^{-1}$ and $+1 \cdot 10^{-6}$ $K^{-1}$.

The outer frame of the composite element comprises, in particular, a metal, appropriately an alloy, or is composed of a metal or an alloy. The alloy can be formed here, for example, as a titanium-niobium alloy, in particular with a weight percent for niobium that lies between 10% and 25%, preferably between 10% and 22%, especially preferred between 17% and 22%.

Particularly when the outer frame comprises a titanium-niobium alloy or is composed of it, but also independently thereof, it can be provided that the alloy, in particular the titanium-niobium alloy, comprises an α phase, a β phase, or an ω phase; or an α phase and a β phase, an α phase and an ω phase, or a β phase and an ω phase; or an α phase and a β phase and an ω phase.

The inner component can comprise, in particular, a transparent material or I composed of a transparent material.

Preferably, the inner component comprises at least one of the following materials or is composed of it: glass, quartz, sapphire, glass ceramic, ceramic laser glass, crystal.

In particular, the laser glasses, crystals, and ceramics already mentioned above come into consideration. Moreover, the inner component can comprise or be composed of a ceramic, in particular a transparent ceramic, preferably yttrium-doped zirconium dioxide. Furthermore, the inner component, on its part, can comprise a coating for increasing the chemical resistance and/or the scratch resistance, preferably $Y_2O_3$. Furthermore, it is possible to arrange one conductor feedthrough or a plurality of conductor feedthroughs within the inner component.

The inner component can have a compressive stress tolerance that is less than 585 MPa, preferably less than 100 MPa, especially preferred less than 8 MPa.

Furthermore, in cross section, the inner component can have a shape that is not circular, but rather, in particular, is oval, polygonal, or rounded polygonal. The outer frame encloses the inner component, which, in particular, is thus shaped in cross section, in a preferably hermetically tight manner.

In the axial direction, the inner component can have at least one arched surface, in particular a convex or concave surface, which, in particular, can protrude out of the outer frame.

The outer frame of the composite element is preferably ring-shaped and/or tubular in design such that the outer frame completely encloses the inner component in cross section. Moreover, the outer frame can have a flange, in particular for attachment to a wall, such as, for example, a wall of a bioreactor.

Finally, the invention also relates to a bioreactor for the culturing of microorganisms or cells by using a composite element that is attached to a wall of the bioreactor in accordance with the above description.

In the disclosure of this specification, the contents of the following publications are incorporated through reference:

Materials Science & Engineering A 731 (2018), A microstructure with improved thermal stability and creep resistance in a novel near-alpha titanium alloy, Tongbo Wang, et. al., whereby reference is made to this content, in particular in regard to the alloy constituents;

Journal of Alloys and Compounds 763 (2018), Influence of the ageing conditions and the initial microstructure on the precipitation of a phase in Ti-17 alloy, Nicolas Maury et. al., whereby reference is made to this content, in particular in regard to the alloy constituents;

Journal of Alloys and Compounds 740 (2018), Adjustable zero thermal expansion in Ti alloys at cryogenic temperature, W. Wang et. al., whereby reference is made to this content, in particular in regard to the production process combining heat treatment and cold rolling;

Scripta Materialia 61 (2009), Controlling the thermal expansion of Ti alloys, Mohamed Abdel-Hady, Masahiko Morinaga, whereby reference is made to this content, in particular in regard to the production process combining heat treatment and cold rolling;

Acta Materialia 124 (2017), Origin of zero and negative thermal expansion in severely-deformed superelastic NiTi alloy, A. Ahadi et. al., whereby reference is made to this content, in particular in regard to the production process combining heat treatment and cold rolling and in regard to adjusted expansion tensors;

Acta Materialia 102 (2016), Tailored thermal expansion alloys, J. A. Monroe et. al., whereby reference is made to this content, in particular in regard to the production process combining heat treatment and cold rolling;

Additive Manufacturing 23 (2018), Microstructure and micro-texture evolution of additively manufactured β-Ti alloys, S. A. Mantri, R. Banerjee., whereby reference is made to this content, in particular in regard to the production process in combination with additive manufacturing;

Journal of Fluorine Chemistry 132 (2011), Fluoride materials for optical applications: Single crystals, ceramics, glasses, and glass-ceramics, Adam J. Stevenson et al., whereby reference is made to this content, in particular in regard to adjusted expansion tensors;

Materials Characterization 145 (2018), Formation mechanism of an α2 phase-rich layer on the surface of Ti-22Al-25Nb alloy, Bin Shao et. al., whereby reference is made to this content, in particular in regard to the influence of the temperature and the holding time on the microstructure composition;

Materials Science & Engineering A 670 (2016), a phase precipitation and mechanical properties of Nb-modified Ti-5553 alloy, Victor C. Opini et. al., whereby reference is made to this content, in particular in regard to the influence of the temperature and the holding time on the microstructure composition;

Scientific Reports (2018) 8:15644. DOI:10.1038/s41598-018-33919-5, Increasing Fracture Toughness and Transmittance of Transparent Ceramics using Functional Low Thermal Expansion Coatings, Marc Rubat du Merac et. al., whereby reference is made to this content, in particular in regard to seals with $Y_2O_3$ under compressive stress of coated transparent ceramics.

METHOD EXAMPLE 1

In accordance with a first example of the method, a composite element can be produced using a thermomechanical production method, whereby, in particular, at least one or a plurality of the following steps, in particular in the sequence given thereof, can be provided.

In accordance with the first method example, it can be provided, if need be, that alloy constituents are homogenized under $N_2$ or Ar atmosphere, for instance. A homogenization can occur, for instance, for a period of 1 to 3 hours—for example, 2 hours—at a temperature between 900° C. and 1100° C., such as, for example, at 1000° C.

In accordance with the first method example, it can further be provided, if need be, that the material is to undergo a step of cold rolling with a reduction of 42% to 90%, for example. In this way, it is possible to achieve a modeling of the phase transitions or a formation of the thermal expansion tensor as a function of the direction of rolling.

In accordance with the first method example, it is further possible, if need be, to provide a step of annealing at 700 to 950° C., which, for example, can take place for 0.25 to 1 hour, in particular 0.5 hour. Furthermore, a step of quenching in water can be provided.

In accordance with the first method example, it can further be provided, if need be, that a base body for the outer frame is cut out of the material.

In accordance with the first method example, it is further possible, if need be, to provide an adjustment step, whereby the thermal expansion tensor (in particular the coefficient of thermal expansion for the first, second, and/or third spatial direction) is adjusted or changed over one thermal cycle or over a plurality of thermal cycles in a targeted manner.

In accordance with the first method example, it can further be provided to combine the outer frame with the inner component or with the transparent structural part, whereby, for this purpose, a further (if need be, final) thermal phase can be provided. The inner component can be inserted thereby in the outer frame, which is expanded with respect to the inner component.

METHOD EXAMPLE 2

In accordance with a second method example, in order to produce a composite element, it is also possible to employ an additive manufacturing method (additive manufacturing/3D printing) to bring about, for example, an anisotropy relative to the direction of layer buildup. In the second method example, it is possible, if need be, to provide, in particular, at least one or a plurality of the following steps in addition to the steps mentioned above.

In accordance with the second method example, it is possible to provide for the use of a powder feeder. This makes possible, for example, a targeted metal composition, for instance through the use of Ti and Nb powder. It is possible to create, for example, a gradient with respect to the composition (Ti, Nb). In this way, the thermal expansion tensor can be influenced in a targeted manner.

In accordance with the second method example, it is possible to provide one step or a plurality of steps, which, if need be, can be cyclic steps, of heating and/or melting, whereby, for this purpose, an energy emitter can be used. For example, the point of impingement of a laser beam can be moved over the material at, for instance, a speed of 0.25 to 5 cm/sec, preferably 1 to 2.5 cm/sec, such as, for example 1.7 cm/sec, whereby, for example, 600 W of power can be provided. Preferably, it is thereby possible to bring about a heating/cooling with each layer. It is also possible to achieve a targeted influencing of the rates of cyclic heating and cooling via the optical laser emitter and/or the layer thickness or the track width, including compensation of the changing rates of cooling with the height of layer buildup. The cooling rate declines, in particular, in the direction of the layer buildup. Overall, it is possible once again to influence the thermal expansion tensor in a targeted manner thereby.

The temperature at which a phase transition, such as, for example the formation of a β phase, occurs can change depending on the alloy composition and/or the height of layer buildup—for example, between 600° C. and 752° C. It is possible to provide a gradient for the laser power and/or for the speed at which the point of impingement of the laser beam is moved over the surface and/or for the layer thickness (for example, 254 nm up to higher values).

BRIEF DESCRIPTION OF THE FIGURES

FIG. 5 shows six different three-dimensional views of a composite element in accordance with a fifth embodiment.

DETAILED DESCRIPTION

Figure 1:
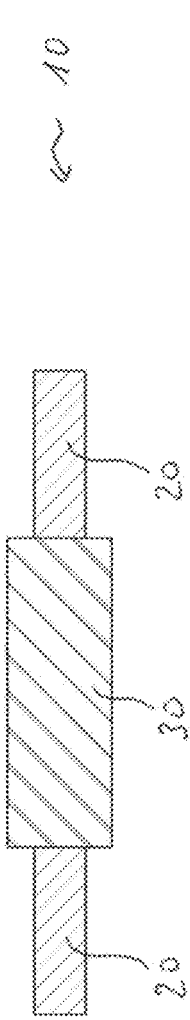
FIG. 1 shows a sectional view of a composite element in accordance with a first embodiment.

FIG. 1 shows a sectional view of a composite element 10 having an outer frame 20 and an inner component 30, wherein the inner component 30 protrudes axially out of the outer frame 20 on both sides.

Figure 2:
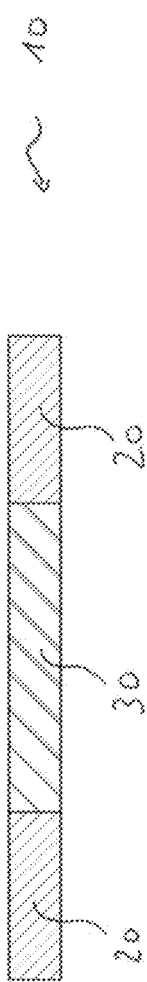
FIG. 2 shows a sectional view of a composite element in accordance with a second embodiment.

FIG. 2 shows a sectional view of a composite element 10 having an outer frame 20 and an inner component 30, wherein the inner component 30 is axially flush with the outer frame 20 on both sides.

Figure 3:
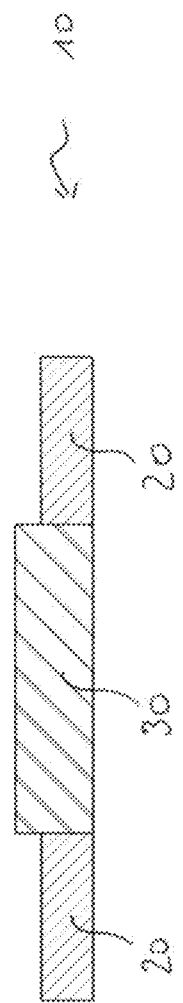
FIG. 3 shows a sectional view of a composite element in accordance with a third embodiment.

FIG. 3 shows a sectional view of a composite element 10 having an outer frame 20 and an inner component 30, wherein the inner component 30 is axially flush with the outer frame 20 on one side and protrudes axially out of the outer frame 20 on the opposite side.

Figure 4:
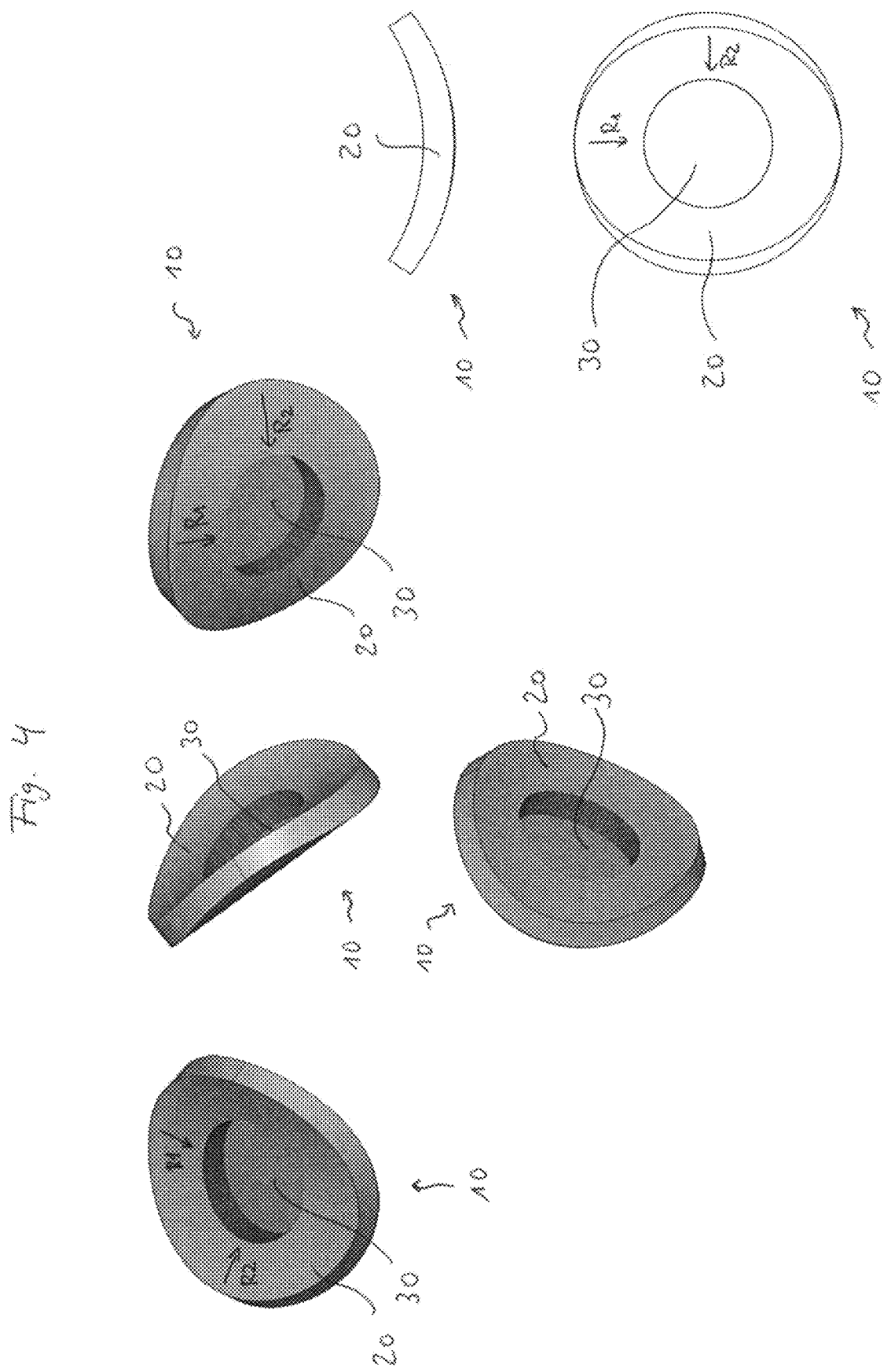
FIG. 4 shows six different three-dimensional views of a composite element in accordance with a fourth embodiment.

FIG. 4 shows different three-dimensional views of a radially symmetric composite element 10 having an outer frame 20 and an inner component 30, wherein the outer frame 20 exerts compressive stresses on the inner component 30 along two spatial directions $R_1$, $R_2$ and the composite element is arched around a spatial direction $R_1$.

FIG. 5 shows different three-dimensional views of a non-radially symmetric composite element 10 having an outer frame 20 and an inner component 30, wherein the outer frame 20 exerts compressive stresses on the inner component 30 along two spatial directions $R_1$, $R_2$ and the composite element is arched around a spatial direction $R_1$.

It is obvious to the person skilled in the art that the features, regardless of the point at which they are disclosed, can define, also individually, essential component parts of the invention, even when they are described jointly together with other features. In particular, the features that are described in connection with the production method of the composite element can also be taken for the composite element and, conversely, the features described in connection with the composite element can also be taken for the production method of the composite element.

What is claimed is:

1. A method for producing a composite element, comprising
providing structural parts consisting of an outer frame and an inner component;
wherein the outer frame comprises metal and has a first coefficient of thermal expansion in a first spatial direction and a second coefficient of thermal expansion in a second spatial direction, the first and second coefficient of thermal expansions differing from one another;
wherein the inner component comprises a material selected from a group consisting of glass, quartz, sapphire, glass ceramic, ceramic, laser glass, and crystal;
heating the outer frame to an expanded state to have the outer frame expanded with respect to the inner component in the first spatial direction in accordance with the first coefficient of thermal expansion and expanded along the second spatial direction in accordance with the second coefficient of thermal expansion;
inserting the inner component in the outer frame when in the expanded state; and
cooling the outer frame so that the outer frame contracts from the expanded state until the inner component is fitted in outer frame under compressive stress.

2. The method of claim 1, wherein the inner component is fitted in the outer frame under a first compressive stress along the first spatial direction and a second compressive stress along the second spatial direction, and wherein the first and second compressive stresses differ from one another.

3. The method of claim 1, further comprising bringing about a phase transition in the metal of the outer frame from one crystal phase to a different crystal phase.

4. The method of claim 3, further comprising changing the first and/or second coefficient of thermal expansion to a predefined value.

5. The method of claim 4, wherein the first coefficient of thermal expansion is changed to a predefined value between $-142 \cdot 10^{-6} K^{-1}$ and $+181 \cdot 10^6 K^{-1}$, and/or
wherein the second coefficient of thermal expansion is changed to a predefined value between $-11 \cdot 10^6 K^{-1}$ and $+24 \cdot 10^{-6} K^{-1}$.

6. The method of claim 1, wherein the metal of the outer frame comprises titanium-niobium alloy having a weight percent of niobium that lies between 10% and 25%.

7. The method of claim 6, further comprising causing the titanium-niobium alloy to undergo a phase transition so that, in the titanium-niobium alloy, an $\alpha$ phase, a $\beta$ phase, or an $\omega$ phase; or an $\alpha$ phase and a $\beta$ phase, an $\alpha$ phase and an $\omega$ phase or a $\beta$ phase and an $\omega$ phase; or an $\alpha$ phase and a $\beta$ phase and an $\omega$ phase is or are formed.

8. The method of claim 7, wherein the heating step comprises heating the outer frame at a condition selected from a group consisting of: heating with a heating rate of 0.01° C/s to 1° C/s, heating with a heating rate of 0.1° C/s to 0.3° C/s, heating with a heating rate of 0.18° C/s, heating at a temperature between 700 and 950 ° C., heating at a maximum temperature of 760° C., heating for a holding time of 0.1 to 10 hours, heating for a holding time of 0.5 to 4.75 hours, and any combinations thereof.

9. The method of claim 1, wherein the inner component is transparent, and wherein the inner component comprises a transparent ceramic comprising yttrium-doped zirconium dioxide.

10. The method of claim 1, wherein the inner component comprises further comprises a coating comprising $Y_2O_3$.

11. The method of claim 1, wherein the inner component has a compressive stress tolerance that is less than 585 MPa.

12. The method of claim 1, wherein the inner component has a compressive stress tolerance that is less than 8 MPa.

13. The method of claim 1, wherein the inner component has a cross sectional shape that is non-circular and is a shape selected from a group consisting of oval, polygonal, and rounded polygonal.

14. The method of claim 1, wherein the inner component has at least convex surface or concave surface that protrudes out of the outer frame.

15. The method of claim 1, further comprising a conductor feedthrough arranged in the inner component.

16. The method of claim 1, wherein the outer frame has a third coefficient of thermal expansion for a third spatial direction, wherein the third spatial direction is different from the first and second spatial directions, and wherein the third coefficient of thermal expansion has a value of less than $1 \cdot 10^{-6} K^{-1}$.

17. The method of claim 16, wherein the third coefficient of thermal expansion is configured so that shear stresses on the inner component are minimized or prevented along the third spatial direction.

18. The method of claim 1, wherein the outer frame is produced by an additive manufacturing method.

19. A composite element produced according to the method of claim 1.

* * * * *